US009485660B2

(12) United States Patent
Cote et al.

(10) Patent No.: US 9,485,660 B2
(45) Date of Patent: Nov. 1, 2016

(54) SYSTEMS AND METHODS TO DETECT AND CHARACTERIZE FAKE CELL TOWERS

(71) Applicants: David Cote, Gatineau (CA); Aung Htay, Alpharetta, GA (US); Roger Michael Elbaz, Alpharetta, GA (US); Logan Blyth, Brookhaven, GA (US)

(72) Inventors: David Cote, Gatineau (CA); Aung Htay, Alpharetta, GA (US); Roger Michael Elbaz, Alpharetta, GA (US); Logan Blyth, Brookhaven, GA (US)

(73) Assignee: Ciena Corporation, Hanover, MD (US)

( * ) Notice: Subject to any disclaimer, the term of this patent is extended or adjusted under 35 U.S.C. 154(b) by 17 days.

(21) Appl. No.: 14/601,957

(22) Filed: Jan. 21, 2015

(65) Prior Publication Data

US 2016/0212623 A1    Jul. 21, 2016

(51) Int. Cl.
| | |
|---|---|
| *H04W 12/00* | (2009.01) |
| *H04W 12/06* | (2009.01) |
| *H04W 12/08* | (2009.01) |
| *H04W 12/12* | (2009.01) |
| *H04W 88/08* | (2009.01) |

(52) U.S. Cl.
CPC .................................. *H04W 12/12* (2013.01)

(58) Field of Classification Search
CPC ... H04W 12/00; H04W 12/06; H04W 12/08; H04W 12/12; H04W 88/08
USPC ................ 455/115.1–115.3, 404.1, 410–411, 455/414.1–414.2, 436, 443–444, 456.1–457
See application file for complete search history.

(56) References Cited

U.S. PATENT DOCUMENTS

| | | | | |
|---|---|---|---|---|
| 8,646,074 B1* | 2/2014 | Gangadharan | ........ | H04W 12/12 726/22 |
| 2006/0193284 A1* | 8/2006 | Stieglitz | .............. | H04L 63/0492 370/328 |
| 2008/0162689 A1* | 7/2008 | Krishnamurthy | ... | H04L 41/5009 709/224 |
| 2013/0276092 A1* | 10/2013 | Sun | ..................... | H04L 63/0227 726/13 |
| 2014/0004829 A1* | 1/2014 | Rieger | .................. | H04W 12/12 455/411 |
| 2015/0140997 A1* | 5/2015 | Goldfarb | ................. | H04W 8/02 455/424 |

OTHER PUBLICATIONS

Rosenblum, Andrew, "Mysterious Phony Cell Towers Could Be Intercepting Your Calls," http://www.popsci.com/article/technology/mysteriousphonycelltowerscouldbeinterceptingyourcalls, Aug. 27, 2014, pp. 1-11.
Brandom, Russell, Phony cell towers are the next big security risk, The Verge, http://www.thevergecom/2014/9/18/6394391/phonycelltowersarethenextbigsecurityrisk, Sep. 18, 2014, pp. 1-5.
Farivar, Cyrus, "New e-mail shows "stingray" maker may have lied to FCC back in 2010," http://arstechnica.com/techpolicy/2014/09/newemailshowsstingraymakermayhaveliedtofccbackin2010/, Sep. 17, 2014, pp. 1-3.

(Continued)

*Primary Examiner* — Michael Mapa
(74) *Attorney, Agent, or Firm* — Clements Bernard PLLC; Christopher L. Bernard; Lawrence A. Baratta, Jr.

(57) ABSTRACT

Systems and methods to detect and characterize fake cell towers in a network operator's network include receiving live data comprising any of crowd-sourced data and tower data; performing live data analysis on the live data and reference data; and detecting the fake cell towers based on the live data analysis. Optionally, spectrum data captured at cell towers by a baseband processor coupled to backhaul equipment can be used as additional input.

15 Claims, 7 Drawing Sheets

(56) References Cited

OTHER PUBLICATIONS

Pell et al., "Your Secret Stingray's no Secret Anymore: The Vanishing Government Monopoly Over Cell Phone Surveillance and its Impact on National Security and Consumer Privacy," Harvard Journal of Law & Technology, vol. 28, No. 1, Fall 2014, pp. 1-76.
"Frequently Asked Questions Regarding 2G Sunset," AT&T Intellectual Property, 2014, pp. 1-4.
"VME Cell Phone Interceptor: VME Cell Phone Interceptor—Real time interception and tracking of cell phone communication," Meganet Corporation, http://www.meganet.com/products/Categories/vmecellphoneinterceptor.asp, pp. 1.
Soltani et al., "Tech firm tries to pull back curtain on surveillance efforts in Washington," The Post, Sep. 17, 2014, pp. 1-5.
Zetter, Kim, "Phone Firewall Identifies Rogue Cell Towers Trying to Intercept Your Calls," Wired, Sep. 3, 2014, pp. 1-3.
Dabrowski et al., "IMSI—Catch Me If You Can: IMSI—Catcher-Catchers," ACM, Dec. 8-12, 2014, pp. 1-10.
GSMK CryptoPhone 500: Technical Specifications, http://www.cryptophone.com, pp. 1-2.
Wong et al., "Soft Handoffs in CDMA Mobile Systems," IEEE Personal Communications, Dec. 1997, pp. 6-17.
"What's Software-Defined Networking (SDN)?," SDX Central, pp. 1-3.
"Performance of the ATLAS Trigger System in 2010," The ATLAS Collaboration, pp. 1-62.
Baak et al., "HistFitter software framework for statistical data analysis," CERN, Oct. 7, 2014, pp. 1-38.
Hoecker et al., "TMVA 4: Toolkit for Multivariate Data Analysis with ROOT: Users Guide," Jul. 9, 2009, pp. 1-134.
Public Class: Telephony Manager—Class Overview, pp. 1-14.
Public Class: Neighboring Cell Info—Class Overview, pp. 1-6.
Levine, Barry, "Who is putting up 'interceptor' cell towers? The mystery deepens," http://venturebeat.com/author/barry-levine/, Sep. 2, 2014, pp. 1-5.

* cited by examiner

| TIME | IMSI | LOCATION | SIGNAL | INTERFERENCE | NOISE |
|---|---|---|---|---|---|
| T1 | IMSI 1 | L1 | S1 | I1 | N1 |
| T1 | IMSI 2 | L2 | S2 | I2 | N2 |
| ... | | | | | |
| T1 | IMSI n | Ln | Sn | In | Nn |

| TIME | IMSI | LOCATION | SIGNAL | INTERFERENCE | NOISE |
|------|------|----------|--------|--------------|-------|
| $T_f$ | IMSI 1 | L F | $S F_1$ | $I F_1$ | $N F_1$ |
| $T_f$ | IMSI 2 | L F | $S F_2$ | $I F_2$ | $N F_2$ |
| ... | | | | | |
| $T_f$ | IMSI n | L n | $S F_n$ | $I F_n$ | $N F_n$ |

SYSTEMS AND METHODS TO DETECT AND CHARACTERIZE FAKE CELL TOWERS

FIELD OF THE DISCLOSURE

The present disclosure relates generally to networking systems and methods. More particularly, the present disclosure relates to systems and methods to detect and characterize fake cell towers.

BACKGROUND OF THE DISCLOSURE

Cell phones normally connect to the strongest signal from the nearest cell tower to maximize the signal quality and to minimize their own power usage. Additionally, the cell phones authenticate with the cell towers. International Mobile Subscriber Identity (IMSI) catchers are used in mobile networks to identify and eavesdrop on mobile devices, namely, the cell phones. These catchers lightly emulate fake cell towers, forcing these mobile devices to connect with them, even when they are not engaged in a telephone call. In a 2G Global System for Mobile Communications (GSM) network, the cell towers do not authenticate with the cell phones, making it relatively easy to attack. Modern 3G and 4G networks are relatively safe because they practice two-way authentication. However, 2G/GSM is still used by service providers as the fallback network when both 3G and 4G are not available. It is estimated that it will be years (2017 or later) before service providers will abandon the 2G/GSM towers. This does not preclude 4G interception as a threat; modern devices such as the VME Dominator do currently have this ability, and more sophisticated devices will undoubtedly be available in the future. Safeguarding (physically deploying towers to protect other towers) an area only works on a small scale. The location-dependent known-good tower list, could be outdated, or poisoned by malicious actors. Once a cell phone is intercepted, a variety of "over-the-air" attacks become possible, including, but not limited to, telephone call eavesdropping, text message eavesdropping, and spyware loading. Once a cell phone is captured, this needs to be detected and characterized.

Service providers do not allow for IMSI catchers to operate on their networks, lawful interceptors notwithstanding. However, service providers are not currently able to identify rogue IMSI catchers and prevent them from operating on their networks. Conventional detection techniques are directed towards the perspective of users of the network, not network operators. The users of a network don't know with 100% confidence if their phone is connecting to a tower operated by their provider or a "stingray" device. The conventional detection techniques rely on either setting up towers to "safeguard" a specific geographic area, or compared with a historical list of known-good towers for the current geographical position of the phone. As mentioned previously, safeguarding (physically deploying towers to protect other towers) an area only works on a small scale. The location-dependent known-good tower list, could be outdated, or poisoned by malicious actors.

BRIEF SUMMARY OF THE DISCLOSURE

In an exemplary embodiment, a method, implemented on a server, to detect fake cell towers in a network operator's network includes receiving live data comprising any of crowd-sourced data and tower data; performing live data analysis on the live data and reference data; and detecting the fake cell towers based on the live data analysis. The method can further include characterizing the fake cell towers based on the crowd-sourced data of cell phones near the fake cell towers. The live data analysis can utilize big data analytics to detect the fake cell towers based on comparisons with the reference data, wherein the reference data includes samples of the live data without fake cell towers included therein. Optionally, the reference data can further include samples of the live data with fake cell towers included therein. The crowd-sourced data can be received from a plurality of cell phones operating on the network and the tower data is received from cell towers in the network. The crowd-sourced data can include Received Signal Strength Indicator data and soft handoff data, and wherein the tower data can include location data and Distributed Power Control data. The detection of fake cell towers can be performed from multiple data sources simultaneously, using multivariate techniques comprising Boosted Decision Trees or Neural Networks to handle statistical correlations of the multiple data sources.

The live data can further include spectrum data captured at cell towers in the network by a baseband processor coupled to backhaul equipment. The detecting the fake cell towers, in part, can utilize location data to correlate and detect spikes of multiple cell phones at a same location. The detecting the fake cell towers, in part, can be based on a non-participation of the fake cell towers in Distributed Power Control. The characterizing the fake cell towers can include determining an area of reach and a capture efficiency of the fake cell towers. The characterizing the fake cell towers can utilize all collectable information from the tower data, the crowd sourced data or backhaul data, and the collectable information is extracted separately for captured devices and devices who escaped capture, using statistical methods. The server can be a Software Defined Networking (SDN) controller.

In another exemplary embodiment, a controller configured to detect fake cell towers in a network operator's network includes a processor; a network interface coupled to the processor; and memory storing instructions that, when executed, cause the processor to obtain live data comprising any of crowd-sourced data and tower data, perform live data analysis on the live data and reference data, and detect the fake cell towers based on the live data analysis. The instructions that, when executed, can further cause the processor to characterize the fake cell towers based on the crowd-sourced data of cell phones near to the fake cell towers. The live data analysis can utilize big data analytics to detect the fake cell towers based on comparisons with the reference data, wherein the reference data comprises samples of the live data with and without fake cell towers included therein. The crowd-sourced data can be received from a plurality of cell phones operating on the network and the tower data is received from cell towers in the network. The crowd-sourced data can include Received Signal Strength Indicator data and soft handoff data, and wherein the tower data can be location data and Distributed Power Control data. The live data can further include spectrum data captured at cell towers in the network by a baseband processor coupled to backhaul equipment. The detecting the fake cell towers, in part, can utilize location data to correlate and detect spikes of multiple cell phones at a same location and, in part, can be based on a fact the fake cell towers do not participate in Distributed Power Control.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, systems and methods to detect and characterize fake cell towers are described. The fake cell towers are Man in the Middle (MITM) devices for the cellular networks. Once a cell phone is captured by the fake cell tower, the traffic content data is collected and then forwarded to a "real" cell tower so the cell phone user is unaware of the interception. The reach of a fake tower can be up to a mile away, forcing thousands of phones in a region to connect to it. The systems and methods detect fake cell towers from a service provider perspective, i.e., detect and characterize the illicit and unlawful use of IMSI catchers. Characterizing the fake cell towers and collecting statistics about their usage brings valuable information for the entire network security business. The systems and methods identify and characterize fake towers from a global network perspective, using Big Data analytics. That is, instead of considering this problem for an individual cell phone, the systems and methods consider the entire network at once. From this global perspective, network operators can potentially detect and characterize fake towers in their network by monitoring specific data sources and looking for anomalous patterns, which enables a new type of security application.

Although the exemplary embodiments described herein reference the Second Generation (2G) digital mobile communications standard, it is purely used as an example for the standard at which MITM "fake tower" devices are currently downgrading higher standards in their attacks. The foreseeable future includes attacks which occur on any standard, such as transmission over Third Generation (3G) and Fourth Generation (4G)-enabled networks. The systems and methods described herein utilize an unprecedented approach to determine the presence of a MITM device by coupling and analyzing Distributed Power Control (DPC) and cellular soft-handoff data, regardless of which digital communication standard is being used. The digital communication standard being used simply allows this method to better characterize these MITM "fake tower" devices, allowing for enhanced detection. It should also be noted that regardless of the generation digital communication standard, the fake cell tower will misbehave from the network operator's perspective. The fake cell tower will prevent phones it can communicate with from performing a soft-handoff and will also not adhere to the DPC algorithm.

Detection System

Figure 1:
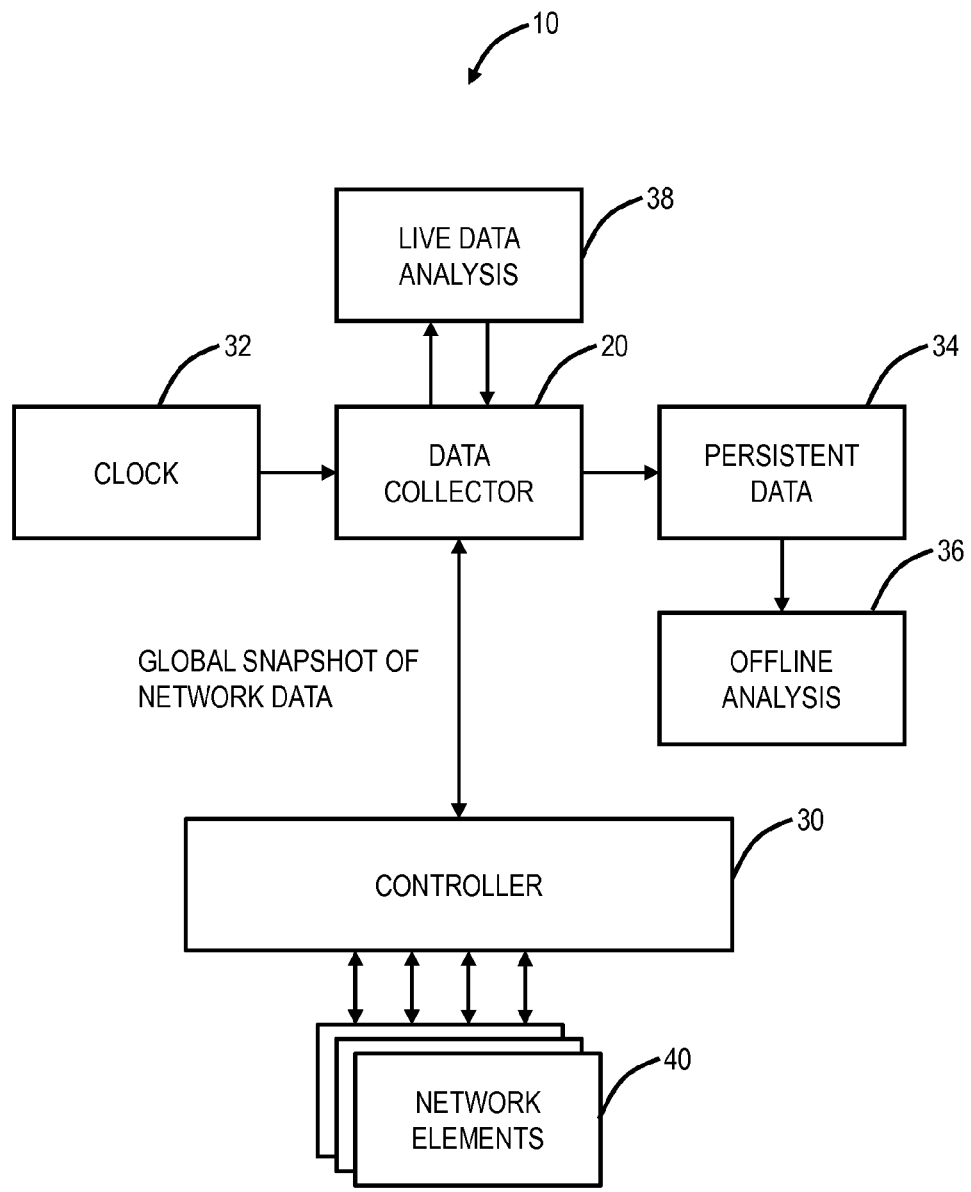
FIG. 1 is a block diagram of a detection system for detecting and characterizing fake cell towers, in accordance with embodiments of the present disclosure.

Referring to FIG. 1, in an exemplary embodiment, a block diagram illustrates a detection system 10 for detecting and characterizing fake cell towers. The detection system 10 includes a data collector 20 coupled to a controller 30. The data collector 20 is coupled to a clock 32 and has persistent data 34, in a database, on which offline analysis 36 is performed. For live data, live data analysis 38 is performed. The controller 30 is coupled to one or more network elements 40, and in an exemplary embodiment, the controller 30 can be a Software Defined Networking (SDN) controller, a Network Management System (NMS), and Element Management System (EMS), or the like. Note, the detection system 10 is merely an illustration of a hardware system for realizing the methods described herein. The controller 30 can receive information from the entire network and send instructions to each of the network elements 40. The data collector 20 records a snapshot of the network state periodically, such as, for example, approximately every second, i.e., at time intervals shorter than most phone conversations. The collected data is analyzed in real-time by a collection of software applications (such as, for example, SDN applications) and is stored in a persistent data 34 database for offline analysis. The data collector 20 can include hardware embedded with a baseband processor, in the network, to collect specific data.

To identify fake cell towers, the detection system 10 can use pre-defined reference samples that contain no fake cell towers and are similar to the network data of interest. Such samples can come either from simulations or from historical data. A basic analysis strategy includes comparing the live data with these "background" reference samples, looking for statistically significant patterns only appearing in the live data, which would originate from the presence of one or several attackers in the network. To increase the sensitivity of the fake cell towers detection, the detection system 10 can use additional reference samples which are known to contain attacker(s). Different "attacker" reference samples can optionally be used to model different types of fake cell towers. These additional samples can then be combined with the above "background" reference samples in a statistical regression of the live data, resulting in significantly increased identification accuracy for the modeled types of attackers and bringing the possibility to count the number of attackers of each type in the network.

The detection system 10 can analyze an individual source of data, as well as perform analysis simultaneously for multiple data sources to increase the accuracy. The flexible nature of the detection system 10 also allows for virtually un-limited updates of its detection and characterization algorithms over time.

While working with large data sets can be technically challenging, a growing number of Big Data applications have been successfully deployed by organizations in the scientific, governmental and private sectors. Furthermore, the availability of specialized open-source software frameworks such as Apache Hadhoop makes large-scale data storage and processing increasingly accessible. In the telecommunication industry, Software Defined Networking (SDN) will enable the usage of sophisticated data collection and data analysis applications (SDN-Apps) at large scale. It is hence foreseen that network-providers will progressively deploy the underlying Big Data infrastructure.

The following table illustrates examples of data processed by the data collector 20.

TABLE 1 various types of fake cell tower data with their data collection requirements.

| Type of data | Equipment requirements to collect data |
| --- | --- |
| GPS data of the cell phone (unusual cell location) | Normal access to crowd sourced data |
| Missing or unusual caller ID, SMS | Normal access to crowd sourced data |
| Unusual frequency usage | Normal access to crowd sourced data |
| Short living cells | Normal access to crowd sourced data |
| Unusual cell capabilities | Normal access to crowd sourced data |
| Guard channel usage | Normal access to crowd sourced data |
| Disabled cipher (encryption) | Normal access to crowd sourced data |
| Network parameters | Normal access to tower data |
| Tower identification | Normal access to tower data/crowd sourced data |
| Neighbor list manipulation | Normal access to tower data/crowd sourced data |

TABLE 1-continued various types of fake cell tower data with
their data collection requirements.

| Type of data | Equipment requirements to collect data |
| --- | --- |
| Soft handoff | Normal access to tower data |
| Distributed Power Control (DPC) | Normal access to tower data |
| Receive gain | Special access to backhaul data |
| RF jamming | Special access to backhaul data |

Data Collection

Figure 2:
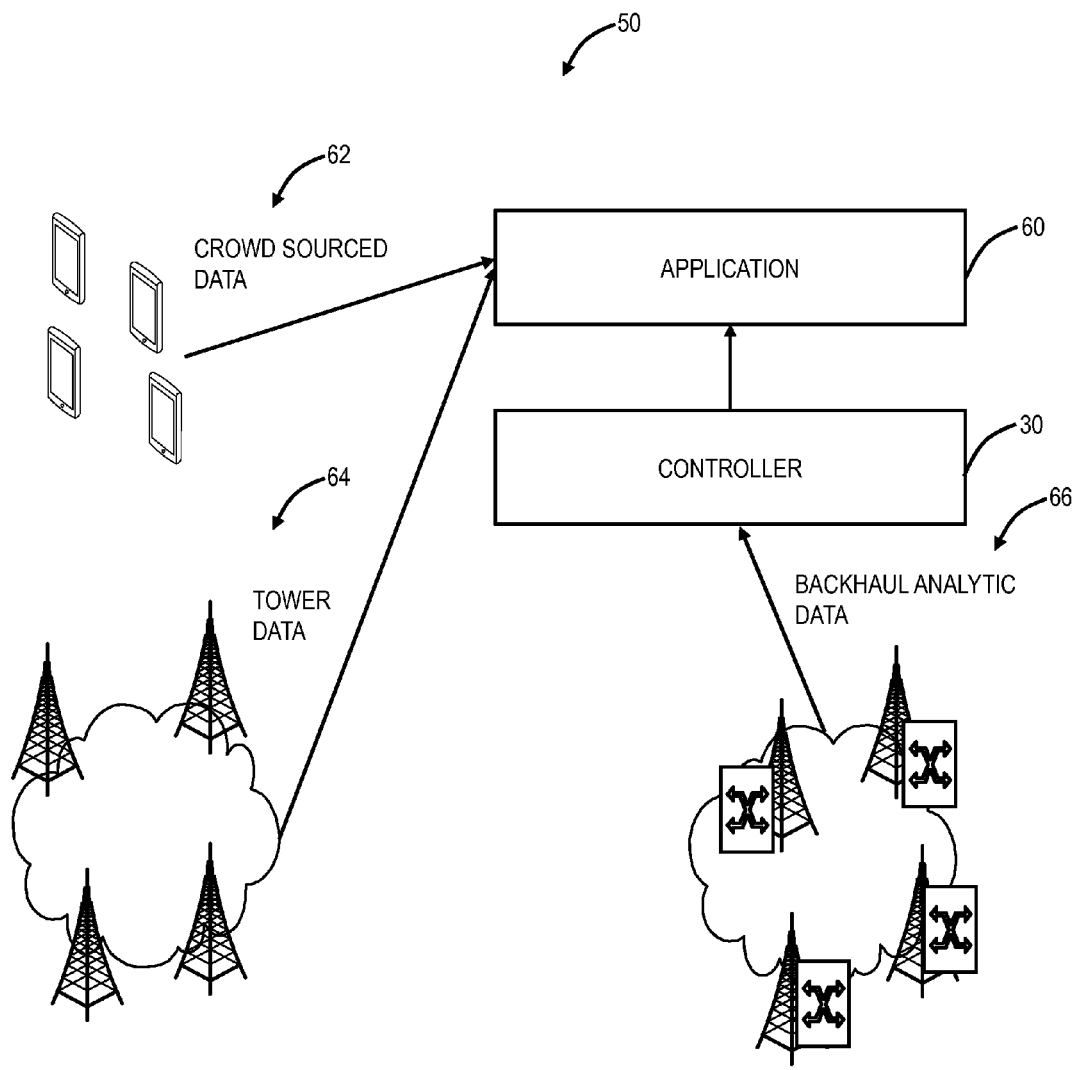
FIG. 2 is a network diagram of a data collection system for the data collector in the detection system of FIG. 1.

Referring to FIG. 2, in an exemplary embodiment, a network diagram illustrates a data collection system 50 for the data collector 20 in the detection system 10. The data collector 20, the analysis 36, 38, and the clock 32 can be realized in an application 60 implemented on one or more servers. In an exemplary embodiment, the application 60 is an SDN application and the controller 30 is an SDN controller; although other embodiments are contemplated. As illustrated in Table 1, the above data collection system 50 obtains three types of information, namely crowd sourced data 62 from cell phones, tower data 64 from cell towers, and backhaul analytic data 66 from wireless backhaul systems. The data 62, 64 is provided to the application 60 directly while the data 66 is provided to the application 60 from the controller 30. The crowd-sourced data can be received from a plurality of cell phones operating on the network and the tower data is received from cell towers in the network. Stated differently, the crowd-sourced data is from users whereas the tower data is from the network operators. The crowd-sourced data can include Received Signal Strength Indicator data and soft handoff data, and the tower data can include location data and Distributed Power Control data. The live data can further include spectrum data captured at cell towers in the network by a baseband processor coupled to backhaul equipment. The collection of most data types, for the detection system 10, requires basic access to the crowd sourced data 62 or the tower data 64, except for a few types that require a dedicated backhaul device, to collect the backhaul analytic data 66. As described below, all the tower data 64 obtained through tower requirement scenarios can be compared to the crowd sourced data 62, and the different data types can be optionally combined to increase the sensitivity of the detection algorithm, but no single type is mandatory.

The collected data 62, 64, 66 is data analyzed in real-time by the application 60 (or a combination of applications) and is stored in the persistent data 34 database for the offline analysis 36. If the resulting data rate exceeds the capacity of the implemented infrastructure, the data acquisition can be instrumented with a "trigger" system (see, for example, arxiv.org/abs/1110.1530) to only store snapshots in which interesting events have occurred and to react to events by dynamically increasing or decreasing the amount of detailed information about specific aspects.

Detection Process

To identify fake cell towers, the application 60 uses pre-defined reference samples that are similar to the network data of interest and contain no fake cell towers. Such samples can come either from simulations or from historical data. Again, a basic analysis strategy includes comparing live data with these "background" reference samples, looking for statistically significant patterns only appearing in the live data. Such patterns could originate from the presence of one or several attackers in the network. This can be efficiently performed with a statistical regression method returning the total number of fake cell towers in the network. In the context of particle physics, this procedure is often referred to as "background-only fit." (See, for example, M. Baak et al., HistFitter software framework for statistical data analysis, ref.: arxiv.org/abs/1410.1280).

To increase the sensitivity of the fake cell tower detection, the application 60 can use additional reference samples which are known to contain attacker(s). Different "attacker" reference samples can optionally be used to model different types of fake cell towers. These additional samples can then be combined with the above "background" reference samples in a statistical regression of the live data, resulting in significantly increased identification accuracy for the modeled types of attackers and bringing the possibility to count the number of attackers of each type in the network.

The above analysis can be performed for an individual source of data, but it can also be performed simultaneously for multiple data sources to increase the accuracy. In a multivariate analysis, the likelihood functions of the different data sources can simply be multiplied if the individual data sources are un-correlated. However, it frequently happens that individual data sources do have correlations, in which case they can be combined with machine learning techniques like Boosted Decision Tree or Neural Network (See, for example, A. Hoecker et al., TMVA—Toolkit for Multivariate Data Analysis, ref: arxiv.org/abs/physics/0703039).

Figure 3:
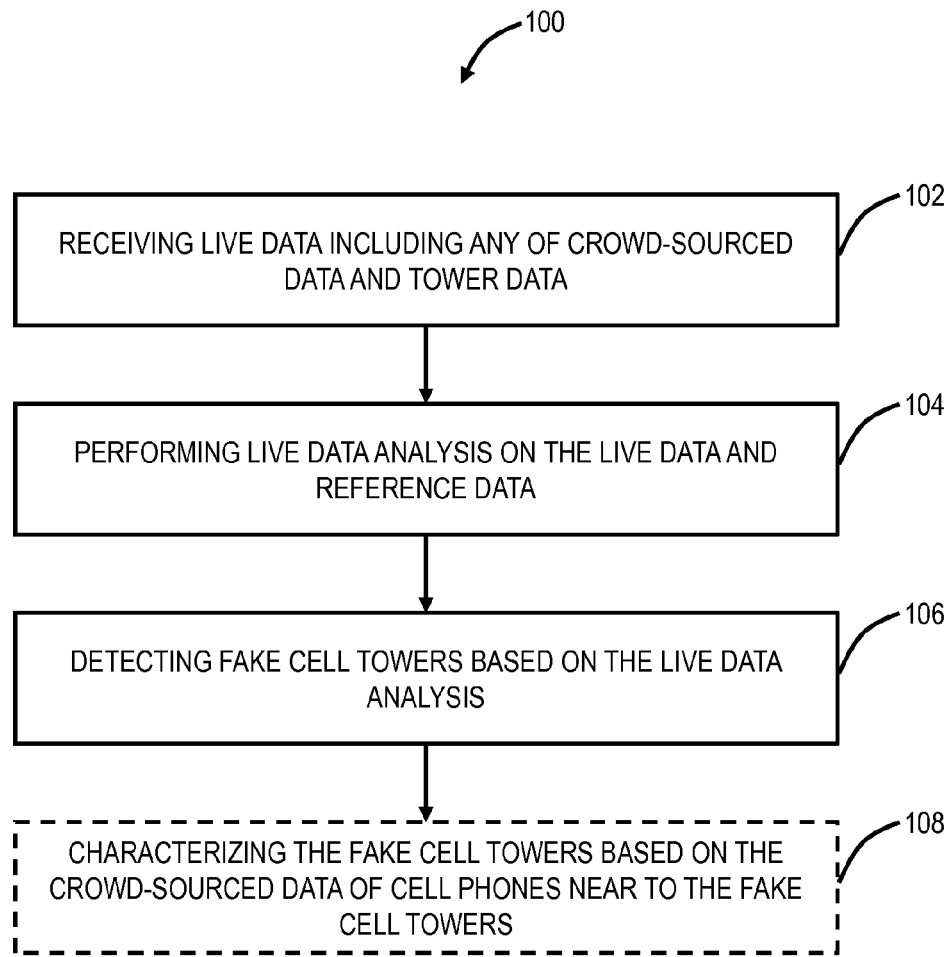
FIG. 3 is a flow chart of a fake cell tower detection process.

Referring to FIG. 3, in an exemplary embodiment, a flow chart illustrates a fake cell tower detection process 100. The detection process 100 contemplates operation in the detection system 10, with the data collection system 50, and/or through the application 60. The detection process 100 includes receiving live data including any of crowd-sourced data and tower data (step 102); performing live data analysis on the live data and reference data (step 104); detecting fake cell towers based on the live data analysis (step 106); and characterizing the fake cell towers based on the crowd-sourced data of cell phones near to the fake cell towers (step 108). Optionally, the live data can also include backhaul analytic data.

The live data analysis can utilize big data analytics to detect the fake cell towers based on comparisons with the reference data, and the reference data can include samples of the live data without fake cell towers included therein. The reference data can further include samples of the live data with fake cell towers included therein. The detecting the fake cell towers in part can utilize location data to correlate and detect spikes of multiple cell phones at a same location. The detecting the fake cell towers in part can be based on a fact the fake cell towers do not participate in Distributed Power Control. The characterizing the fake cell towers can include determining an area of reach of the fake cell towers. Optionally, the server is a Software Defined Networking (SDN) controller.

Detection Example—GPS Correlation

Figures 4, 5:
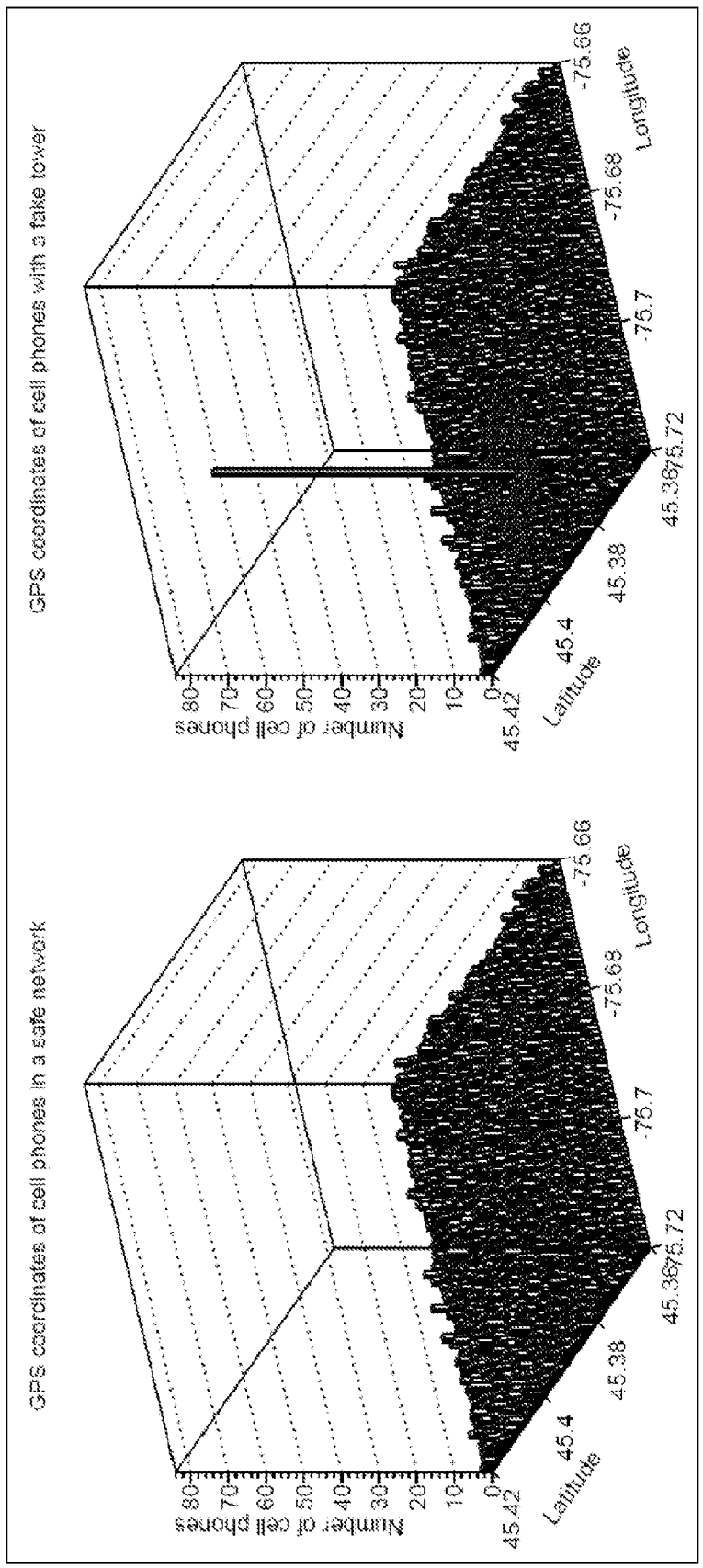
FIGS. 4 and 5 are three-dimensional graphs of GPS coordinate distribution of cell phones in a safe network (FIG. 4) and in a network with a fake tower (FIG. 5)

Specific examples of fake cell tower identification and characterization considering a global network are described as follows. Fake cell towers alter the geographical position (GPS) information about cell phones and connect to multiple phones simultaneously. This introduces correlations in the GPS coordinates of individual phones that should normally be un-correlated, but seem to originate from the same point when they are tricked by a fake tower. Referring to FIGS. 4 and 5, three-dimensional graphs illustrate GPS coordinate distribution of cell phones in a safe network (FIG. 4) and in a network with a fake tower (FIG. 5). The examples in FIGS. 4 and 5 contain ten thousands user agents. The fake tower, in FIG. 5, is positioned at latitude 45.4 and longitude −75.7. It has a reach of 1.1 km and a capture efficiency of 95%. The height of the fake tower spike is truncated for the sake of illustration, but the fake tower actually captured over a thousand phones in this example.

As shown in FIGS. 4 and 5, this pattern can be identified by the application 60, the detection system 10, or the detection process 100 by scanning the GPS location of all cell phones in a network snapshot, looking for "spikes" of multiple phones with the same location. The position of each spike then gives the GPS location of a fake tower and the number of spikes equals the number of fake towers in the network. If many false positive are returned, the detection can be refined with a multivariate analysis of the data sources listed above. For instance, looking for cell phone locations forming a spike and having an unusual cell ID or frequency usage.

An abrupt shift of the GPS position happens at the moment when a cell phone starts to be tricked. This can be identified by the application 60 scanning the variations of GPS positions over time in a live data buffer or in an offline analysis of historical data. The same kind of detection can be applied to other data sources listed above and can optionally be performed simultaneously on multiple sources. For example, if a fake cell tower is placed on a moving truck, it can be tracked by following the position of a GPS position "spike" (as in FIG. 5) changing over time in a live data buffer or in an offline analysis of historical data, providing that data collection time intervals are sufficiently short.

Detection Example—Distributed Power Control (DPC)

Figure 6:
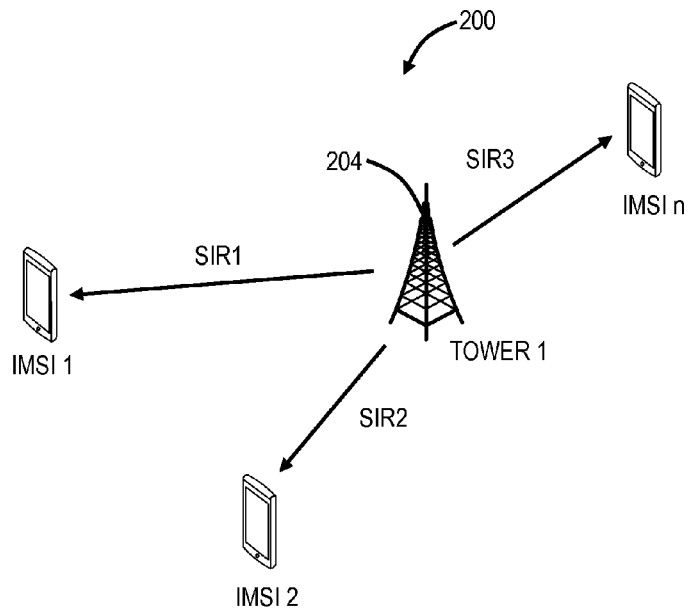
FIGS. 6 and 7 are network diagrams with (FIG. 6) and without (FIG. 7) fake cell towers and associated data using Distributed Power Control (DPC) to detect fake towers.
Figure 7:
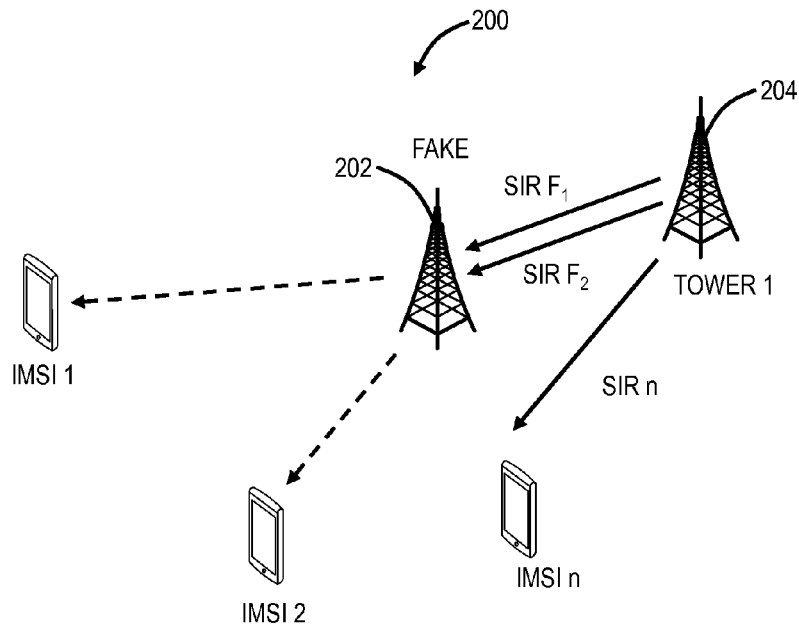

The application 60 can perform analytics based on the fact that the "fake" tower does not participate in the Distributed Power Control (DPC) as the capture phones normally would. A "real" tower performs DPC by measuring a signal to interference ratio (SIR) for the cell phones and communicating the SIRs to the cell phones. SIR equals signal power divided by a combination of interference and noise. The cell phones adjust the transmit power accordingly. The DPC is iterative with the "real" tower measuring and updating the new SIRs to the cell phones. In the data set collected and analyzed by the application 60, values in the Signal column associated with the cell phones vary in the time series data. FIGS. 6 and 7 are examples of using DPC to detect fake towers. Specifically, FIG. 6 is a network diagram of a network 200 without a fake tower, and a table of associated data. FIG. 7 is a network diagram of the network 200 with a fake tower 202, and a table of associated data. For example, assume a cell phone with IMSI 1 has power levels at three different times of 2 mW, 1.40 mW and 1.58 mW. That is the overshoot/undershoot power levels that are appropriately adjusted by the DPC.

Again, FIG. 6 illustrates associated data for the network 200 with a "real" cell tower 204. The data for DPC includes time, IMSI, location, signal, interference, and noise. When the "fake" tower 202 is present, as in FIG. 7, the "fake" tower 202 pretends to be the cell phones to the "real" tower 204. In this situation, the values in the Signal column for the IMSIs captured are most likely to be the same across the time series data, starting at $T_f$.

Characterization of Fake Cell Towers

Not only can the systems and methods identify the presence of fake cell towers, they can also characterize several properties of an individual fake tower by analyzing the data of nearby cell phones on a statistical basis. For instance, in FIGS. 4 and 5, the position of the spike maximum gives the GPS position of a fake cell tower. Around the spike, a circular area contains significantly less phones than usual. The radius of that area gives the reach of the fake cell tower and the number of remaining phones in the circular area, but not in the spike is proportional to the capture efficiency of the fake cell tower. Furthermore, arbitrary information about the phones in the spike (captured devices), in the circular area (devices who escaped capture) or outside the area's radius (unbiased sample of devices) can be compared to extract information about the fake cell tower and its effect on various types of phones. This information can be extracted with a variety of statistical methods, such as sPlot ("SPlot: A Statistical tool to unfold data distributions", Nucl. Instrum. Meth. A555 (2005) 356-369) for example. This information can include DPC, frequency usage, all the collectable data listed in Table 1 above, and more. As a result, it is conceivable that a fake cell tower with specific characteristics can be associated to a known owner or organization by the service provider.

Additionally, the systems and methods enable characterizing the entire population of fake towers in a given network. Meta-information such as the number of fake towers of each type and/or belonging to a certain organization, the time periods of activity, the average reach or capture efficiency, the most frequently used frequency, the probability of a cell phone to be attacked, and so on, can all be extracted by a service provider using the systems and methods.

Data Sources and Analysis

While several examples of data sources and analysis methods to identify and characterize fake towers have been presented above, it should be emphasized that the invention will enable many more data and methods in the future. Furthermore, the systems and methods allow easy and frequent updates of the data sources and analysis methods. Hence, the systems and methods have the capacity to adapt to the evolution of security threats over time and will progressively deploy algorithms of virtually unlimited sophistication.

In addition to the aforementioned data, the following data can be provided to the application 60:

---

Absolute Radio Frequency Channel (ARFC)
Mobile Country Code (MCC)
Mobile Network Code (MNC)
Location Area Code (LAC)
Cell ID (CID)
Latitude (Lat)
Longitude (Lon)
Decibel-milliwatts (dBm) [The dBm range on a cell phone can vary from −121 to −51]

---

The cell phones can include applications or Application Programming Interfaces (API) which provide the data. For example, Android has an API to identify the cell tower with the following API developer.android.com/reference/android/telephony/TelephonyManager.html. Here, the following data can be determined: TelephonyManager.getNetworkCountryIso( ) returns the MCC string; TelephonyManager.getNetworkOperator( ) returns the MCC+MNC string. TelephonyManager.getNetworkOperatorName( ) returns the alphabet name of register operator; and TelephonyManager.getNeighboringCellInfo( ) gives a list of NeighboringCellInfo.

Another API can include developer.android.com/reference/android/telephony/NeighboringCellInfo.html. Here, NeighboringCellInfo.getLac( ) gives LAC, NeighboringCellInfo.getCid( ) gives CID; and NeighboringCellInfo.getRssi( ) gives the received signal strength or UNKNOWN_RSSI if unknown. For GSM, it is in arbitrary strength unit "ASU" ranging from 0 to 31 (dBm=−113+2*asu) 0 means "−113 dBm or less" and 31 means "−51 dBm or greater" For UMTS, it is the Level index of CPICH RSCP defined in TS 25.125.

Reference Data

Reference data is used by the detection system 10 to distinguish and learn behavior with and without fake cell towers. The following Error! Reference source not found., contains the information for real cell towers. At each location, there may be more than one provider. A sample is shown below. The Tower ID is internally generated by the application for ease of reference.

| Tower Id | Lat. | Lon. | MCC | MNC | LAC | CID | Provider | Comment |
|---|---|---|---|---|---|---|---|---|
| TW1 | 34.041180 | −84.284137 | 310 | 260 | 2471 | 11072 | T-Mobile | Opencellid.org |
| TW2 | 34.038900 | −84.290000 | 310 | 260 | 2471 | 252 | T-Mobile | Opencellid.org |
| TW3 | 34.037888 | −84.232416 | 310 | 260 | 2471 | 11072 | AT&T | Atttowers.com |

Error! Reference Source not Found.
The following Table 3—Crowd Sourced Received Signal Strength Indicator Data Set (IMSI protected for privacy), shows an example of crowd reported data. A sample of data collected is shown. The whole dataset consists of measurement done by the cell phone with the person walking from a first location a last location in the table.

TABLE 3

Crowd Sourced Received Signal Strength Indicator Data Set (IMSI protected for privacy)

| IMSI | Lat. | Lon. | MCC | MNC | LAC | CID | RSSI (dBm) | Time | Comment |
|---|---|---|---|---|---|---|---|---|---|
| IMSI#1 | 34.038504 | −84.282116 | 310 | 260 | 2471 | 11072 | −86 | 1414926802000 | Measured @ 1 |
| IMSI#1 | 34.041123 | −84.284596 | 310 | 260 | 2471 | 11072 | −86 | 1414927081000 | Measured @ 2 |
| IMSI#1 | 34.045012 | −84.284694 | 310 | 260 | 2471 | 11072 | −71 | 1414927333000 | Measured @ 3 |
| IMSI#1 | 34.048057 | −84.285641 | 310 | 260 | 2471 | 11072 | −73 | 1414927593000 | Measured @ 6 |
| IMSI#1 | 34.048140 | −84.288428 | 310 | 260 | 2471 | 11072 | −73 | 1414927808000 | Measured @ 7 |

The following Table 4—Distributed Power Control (DPC) Data Set From Cell Towers (480 ms interval), shows how one tower is interacting with one cell phone to control the power. The DPC column indicates the desired power level by the tower. The RSSI value is the actual power lever at the tower. At each iteration, the tower instructs the cell phone to adjust the transmit power. As an example, at fourth iteration, the cell phone is at the desired power level.

TABLE 4

Distributed Power Control (DPC) Data Set From Cell Towers (480 ms interval)

| Tower Id | IMSI | DPC (dBm) | RSSI (dBm) | Time | Comment |
|---|---|---|---|---|---|
| TW1 | IMSI#1 | −71 | −80 | 1414918800000 | Simulated |
| TW1 | IMSI#1 | −78 | −68 | 1414918800480 | Simulated |
| TW1 | IMSI#1 | −76 | −72 | 1414918800960 | Simulated |
| TW1 | IMSI#1 | −75 | −75 | 1414918801440 | Simulated |
| TW1 | IMSI#1 | −75 | −75 | 1414918801920 | Simulated |

The following Table 5—Crowd Sourced Soft Handoff Dataset, shows the soft handoff. Note that the Tower IDs (TW1 and TW2) are used for in this table for clarity. The actual data reported will be in the format MCC, MNC, LAC and Cell Id, which are then used to look up the Tower ID from Error! Reference source not found.

TABLE 5

Crowd Sourced Soft Handoff Dataset (sampled at 30 sec interval)

| IMSI | Lat. | Lon. | Tower Id | RSSI (dBm) | Neighbors | Time | Comment |
|---|---|---|---|---|---|---|---|
| IMSI#1 | 34.038199 | −84.281769 | TW1 | −86 | TW2 | 1415539761000 | Measured |
| IMSI#1 | 34.039541 | −84.283197 | TW1 | −81 | TW2 | 1415539791000 | Measured |
| IMSI#1 | 34.041113 | −84.284670 | TW1 | −76 | TW2 | 1415539851000 | Measured |
| IMSI#1 | 34.038916 | −84.290280 | TW1 | −77 | TW2 | 1415539881000 | Measured |
| IMSI#1 | 34.037563 | −84.292499 | TW1 | −77 | TW2 | 1415539911000 | Measured |
| IMSI#1 | 34.037445 | −84.295348 | TW1 | −93 | TW2 | 1415539941000 | Measured |
| IMSI#1 | 34.037616 | −84.301167 | TW1 | −95 | TW2 | 1415539971000 | Measured |

TABLE 5-continued

Crowd Sourced Soft Handoff Dataset (sampled at 30 sec interval)

| IMSI | Lat. | Lon. | Tower Id | RSSI (dBm) | Neighbors | Time | Comment |
|---|---|---|---|---|---|---|---|
| IMSI#1 | 34.037842 | −84.306223 | TW1 | −90 | TW2 | 1415540001000 | Measured (traffic light) |
| IMSI#1 | 34.037842 | −84.306223 | TW2 | −77 | TW1 | 1415540031000 | Measured (traffic light) |
| IMSI#1 | 34.037842 | −84.306223 | TW2 | −76 | TW1 | 1415540061000 | Measured (traffic light) |
| IMSI#1 | 34.039670 | −84.313105 | TW2 | −85 | TW1 | 1415540091000 | Measured |

The following Table 6—Spectrum Data Captured At Tower (Ciena Service Delivery Switch with Baseband Processor), shows an example of scanning the desired spectrum for evidence of jamming as well as received power at the real cell tower. Note, this is the backhaul analytic data 66, collected by a device coupled to the tower and the backhaul system.

TABLE 6

Spectrum Data Captured At Tower (Ciena Service Delivery Switch with Baseband Processor)

| Tower Id | Spectrum | Jammed | RSSI (dBm) | Time | Comment |
|---|---|---|---|---|---|
| TW1 | LTE 1 (2100 MHz) | N | −80 | | Simulated |
| TW1 | LTE 2 (1900 MHz) | N | −68 | | Simulated |
| TW1 | LTE 3 (1800 MHz) | N | −72 | | Simulated |
| TW1 | LTE 4 (AWS) | N | −75 | | Simulated |
| TW1 | LTE 5 (850 MHz) | N | −75 | | Simulated |

The following tables show what the data might look like when a fake tower is present. A new CID (indicating a fake tower) would be reported by the IMSI#1 at location 6 and 7. The RSSI would also indicate the stronger strength (see Table 7 Crowd Sourced Received Signal Strength Indicator Data Set).

TABLE 7

Crowd Sourced Received Signal Strength Indicator Data Set (with a fake tower)

| IMSI | Lat. | Lon. | MCC | MNC | LAC | CID | RSSI (dBm) | Time | Comment |
|---|---|---|---|---|---|---|---|---|---|
| IMSI#1 | 34.038504 | −84.282116 | 310 | 260 | 2471 | 11072 | −86 | 1414926802000 | Measured @ 1 |
| IMSI#1 | 34.041123 | −84.284596 | 310 | 260 | 2471 | 11072 | −86 | 1414927081000 | Measured @ 2 |
| IMSI#1 | 34.045012 | −84.284694 | 310 | 260 | 2471 | 11072 | −71 | 1414927333000 | Measured @ 3 |
| IMSI#1 | 34.048057 | −84.285641 | 310 | 260 | 2471 | 111 | −66 | 1414927593000 | Simulated @ 6 |
| IMSI#1 | 34.048140 | −84.288428 | 310 | 260 | 2471 | 111 | −66 | 1414927808000 | Simulated @ 7 |

At the real tower, the following information about IMSI#1 would be reported to the application 60 showing that the fake tower, pretending to be IMSI#1 is not obeying the DPC algorithm (see Table 8—Distributed Power Control (DPC) Data Set from Cell Tower (with a fake tower in the middle)).

TABLE 8

Distributed Power Control (DPC) Data Set from Cell Tower (with a fake tower in the middle)

| Tower Id | IMSI | DPC (dBm) | RSSI (dBm) | Time | Comment |
|---|---|---|---|---|---|
| TW1 | IMSI#1 | −71 | −80 | 1414927593000 | Simulated |
| TW1 | IMSI#1 | −78 | −80 | 1414927593480 | Simulated |
| TW1 | IMSI#1 | −76 | −80 | 1414927593960 | Simulated |
| TW1 | IMSI#1 | −75 | −80 | 1414927594440 | Simulated |
| TW1 | IMSI#1 | −75 | −80 | 1414927594920 | Simulated |

A service delivery switch equipped with a baseband processor, would observed that the signal is jammed.

TABLE 9

Spectrum Data Captured At Tower (with fake tower jamming signals)

| Tower Id | Spectrum | Jammed | RSSI (dBm) | Time | Comment |
|---|---|---|---|---|---|
| TW1 | LTE 1 (2100 MHz) | Y | −125 | 1414927593000 | Simulated |

TABLE 9-continued

Spectrum Data Captured At Tower
(with fake tower jamming signals)

| Tower Id | Spectrum | Jammed | RSSI (dBm) | Time | Comment |
|---|---|---|---|---|---|
| TW1 | LTE 2 (1900 MHz) | Y | −125 | 1414927593000 | Simulated |
| TW1 | LTE 3 (1800 MHz) | Y | −125 | 1414927593000 | Simulated |
| TW1 | LTE 4 (AWS) | Y | −125 | 1414927593000 | Simulated |
| TW1 | LTE 5 (850 MHz) | Y | −125 | 1414927593000 | Simulated |

SDN Controller/Server for the Application

Figure 8:
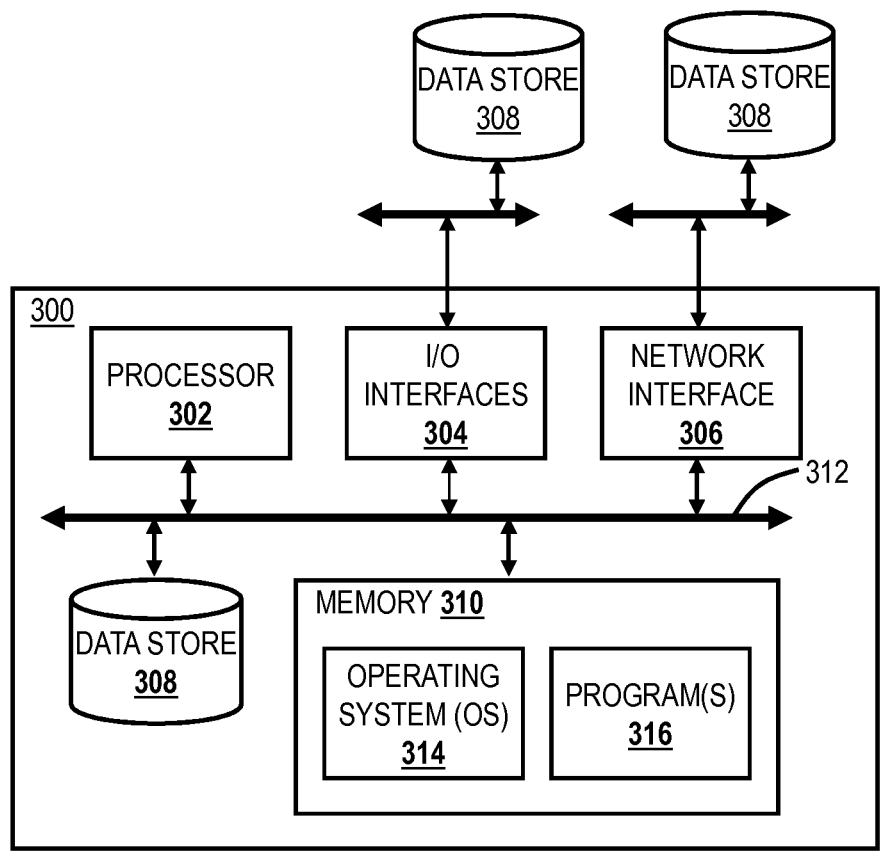
FIG. 8 is a block diagram illustrates a server, such as for the controller in the detection system of FIG. 1.

Referring to FIG. 8, in an exemplary embodiment, a block diagram illustrates a server 300 such as for the controller 30. The server 300 can be a digital computer that, in terms of hardware architecture, generally includes a processor 302, input/output (I/O) interfaces 304, a network interface 306, a data store 308, and memory 910. It should be appreciated by those of ordinary skill in the art that FIG. 8 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 can be used to receive user input from and/or for providing system output to one or more devices or components. User input can be provided via, for example, a keyboard, touch pad, and/or a mouse. System output can be provided via a display device and a printer (not shown). I/O interfaces 304 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 306 can be used to enable the server 300 to communicate on a network. The network interface 306 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 300 such as, for example, an internal hard drive connected to the local interface 312 in the server 300. Additionally in another embodiment, the data store 308 can be located external to the server 300 such as, for example, an external hard drive connected to the I/O interfaces 304 (e.g., SCSI or USB connection). In a further embodiment, the data store 308 can be connected to the server 300 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

In an exemplary embodiment, the controller 30 can be implemented through the server 300 where the network interface 308 is communicatively coupled to one or more nodes in a network. The controller 30 can also include an Application Programming Interface (API) which allows additional applications to interface with the SDN controller for data associated with the network. In an exemplary embodiment, one or more applications can be implemented on the server 300 (or on the server 300 operating as the SDN controller 30) for the SDN control plane, and receive data through the API. Other configurations are also contemplated.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, implemented on a server, to detect fake cell towers in a network operator's network, the method comprising:
    receiving live data comprising any of crowd-sourced data and tower data, wherein the crowd-sourced data is received from a plurality of cell phones operating on the network and the tower data is received from cell towers in the network;
    performing live data analysis on the live data and reference data, wherein the live data analysis compares the live data and the reference data to determine statistically significant patterns only shown in the live data, wherein the reference data comprises samples of the live data without fake cell towers included therein;
    detecting the fake cell towers based on the live data analysis and indications of the statistically significant patterns, wherein the fake cell towers are Man in the Middle (MITM) devices in the network which collect data and forward the data to a real cell tower such that a user is unaware; and
    characterizing the fake cell towers based on any of the tower data, the crowd sourced data, and backhaul data, wherein any of the tower data, the crowd sourced data, and the backhaul data is extracted separately for captured devices which associate with the fake cell towers and devices that escaped capture which are in range of the fake towers, wherein the characterizing uses statistical methods to compare data from the captured devices and the devices that escaped capture.

2. The method of claim 1, wherein the live data analysis utilizes big data analytics to detect the fake cell towers based on the comparisons with the reference data.

3. The method of claim 2, wherein the reference data further comprises samples of the live data with fake cell towers included therein.

4. The method of claim 1, wherein the crowd-sourced data comprises Received Signal Strength Indicator data and soft handoff data, and wherein the tower data is location data and Distributed Power Control data.

5. The method of claim 1, wherein the detection of fake cell towers is performed from multiple data sources simultaneously, using multivariate techniques comprising Boosted Decision Trees or Neural Networks to handle statistical correlations of the multiple data sources.

6. The method of claim 1, wherein the live data further comprises spectrum data captured at cell towers in the network by a baseband processor coupled to backhaul equipment.

7. The method of claim 1, wherein the detecting the fake cell towers, in part, utilizes location data to correlate and detect spikes of multiple cell phones at a same location.

8. The method of claim 1, wherein the detecting the fake cell towers, in part, is based on a non-participation of the fake cell towers in Distributed Power Control.

9. The method of claim 1, wherein the characterizing the fake cell towers comprises determining an area of reach and a capture efficiency of the fake cell towers.

10. The method of claim 1, wherein the server is a Software Defined Networking (SDN) controller.

11. A controller configured to detect fake cell towers in a network operator's network, the controller comprising:
    a processor;
    a network interface coupled to the processor; and
    memory storing instructions that, when executed, cause the processor to
        obtain live data comprising any of crowd-sourced data and tower data, wherein the crowd-sourced data is received from a plurality of cell phones operating on the network and the tower data is received from cell towers in the network,
        perform live data analysis on the live data and reference data, wherein the live data analysis compares the live data and the reference data to determine statistically significant patterns only shown in the live data, wherein the reference data comprises samples of the live data without fake cell towers included therein,
        detect the fake cell towers based on the live data analysis and indications of the statistically significant patterns, wherein the fake cell towers are Man in the Middle (MITM) devices in the network which collect data and forward the data to a real cell tower such that a user is unaware; and
        characterize the fake cell towers based on any of the tower data, the crowd sourced data, and backhaul data,
        wherein any of the tower data, the crowd sourced data, and the backhaul data is extracted separately for captured devices which associate with the fake cell towers and devices that escaped capture which are in range of the fake towers, wherein the fake cell towers are characterized using statistical methods to compare data from the captured devices and the devices that escaped capture.

12. The controller of claim 11, wherein the live data analysis utilizes big data analytics to detect the fake cell towers based on the comparisons with the reference data.

13. The controller of claim 11, wherein the crowd-sourced data comprises Received Signal Strength Indicator data and soft handoff data, and wherein the tower data is location data and Distributed Power Control data.

14. The controller of 11, wherein the live data further comprises spectrum data captured at cell towers in the network by a baseband processor coupled to backhaul equipment.

15. The controller of claim 11, wherein the detecting the fake cell towers, in part, utilizes location data to correlate and detect spikes of multiple cell phones at a same location and, in part, is based on a fact the fake cell towers do not participate in Distributed Power Control.

* * * * *